United States Patent [19]

Mueller et al.

[11] Patent Number: 4,612,245
[45] Date of Patent: Sep. 16, 1986

[54] BLOWN BUBBLE PROCESS FOR PRODUCING ORIENTED THIN FILMS

[75] Inventors: Walter B. Mueller, Taylors; Julian H. Schoenberg, Greenville, both of S.C.

[73] Assignee: W. R. Grace & Co., Cryovac Div., Duncan, S.C.

[21] Appl. No.: 654,581

[22] Filed: Sep. 25, 1984

Related U.S. Application Data

[63] Continuation of Ser. No. 523,294, Aug. 15, 1983, abandoned, which is a continuation of Ser. No. 289,018, Jul. 31, 1981, abandoned.

[51] Int. Cl.$^4$ .................. B32B 27/32; B32B 31/02
[52] U.S. Cl. ..................... 428/340; 427/35; 427/230; 427/236; 427/289; 427/299; 427/387; 428/36; 428/349; 428/352; 428/447; 428/451
[58] Field of Search ........... 427/236, 230, 35, 289, 427/387, 299; 428/352, 36, 447, 451, 340, 349

[56] References Cited

U.S. PATENT DOCUMENTS

| Re. 28,281 | 12/1974 | Bridgeford | 427/236 |
|---|---|---|---|
| 2,452,080 | 10/1948 | Stephenson | 18/47.5 |
| 2,488,571 | 11/1949 | Trull | 18/47.5 |
| 2,641,022 | 6/1953 | Kress | 18/47.5 |
| 2,789,922 | 4/1957 | Allen | 117/106 |
| 2,888,419 | 5/1959 | Safford | |
| 3,022,543 | 2/1962 | Baird | 428/36 |
| 3,068,516 | 12/1962 | Hofer | 18/13 |
| 3,172,930 | 3/1965 | Johnson | 264/130 |
| 3,280,233 | 10/1966 | Wiggins | 264/89 |
| 3,560,602 | 2/1971 | Marzolf | 264/95 |
| 3,576,658 | 4/1971 | Notomi | 117/7 |
| 3,960,810 | 6/1976 | Chandra | 260/46.5 UA |
| 4,011,128 | 3/1977 | Suzuki | 156/500 |
| 4,151,344 | 4/1979 | Doss | 428/352 |
| 4,192,637 | 3/1980 | Chong | |
| 4,207,353 | 6/1980 | Rasmussen | 427/236 |
| 4,287,151 | 9/1981 | Esakov | 264/560 |
| 4,374,871 | 2/1983 | Steinbis | 427/236 |

FOREIGN PATENT DOCUMENTS

1176204 1/1970 United Kingdom .
2055688A 3/1981 United Kingdom .

OTHER PUBLICATIONS

Analytical Services, Technical Service Request No. 1-3479, Apr. 27, 1979.

Primary Examiner—Ellis P. Robinson
Attorney, Agent, or Firm—John J. Toney; William D. Lee, Jr.; Mark B. Quatt

[57] ABSTRACT

The present invention comprises an improvement upon the blown bubble process for forming thin heat sealable films from an extruded tubular structure. The utilization of a spray nozzle, internal to the extruded tubular structure, to provide a thin inner coating of a liquid polyorganosiloxane greatly reduces the internal film welding of extruded tubular polyolefin materials which internally weld at their processing temperature. Additionally, reduction of the internal welding allows films of reduced thickness to be manufactured.

18 Claims, 4 Drawing Figures

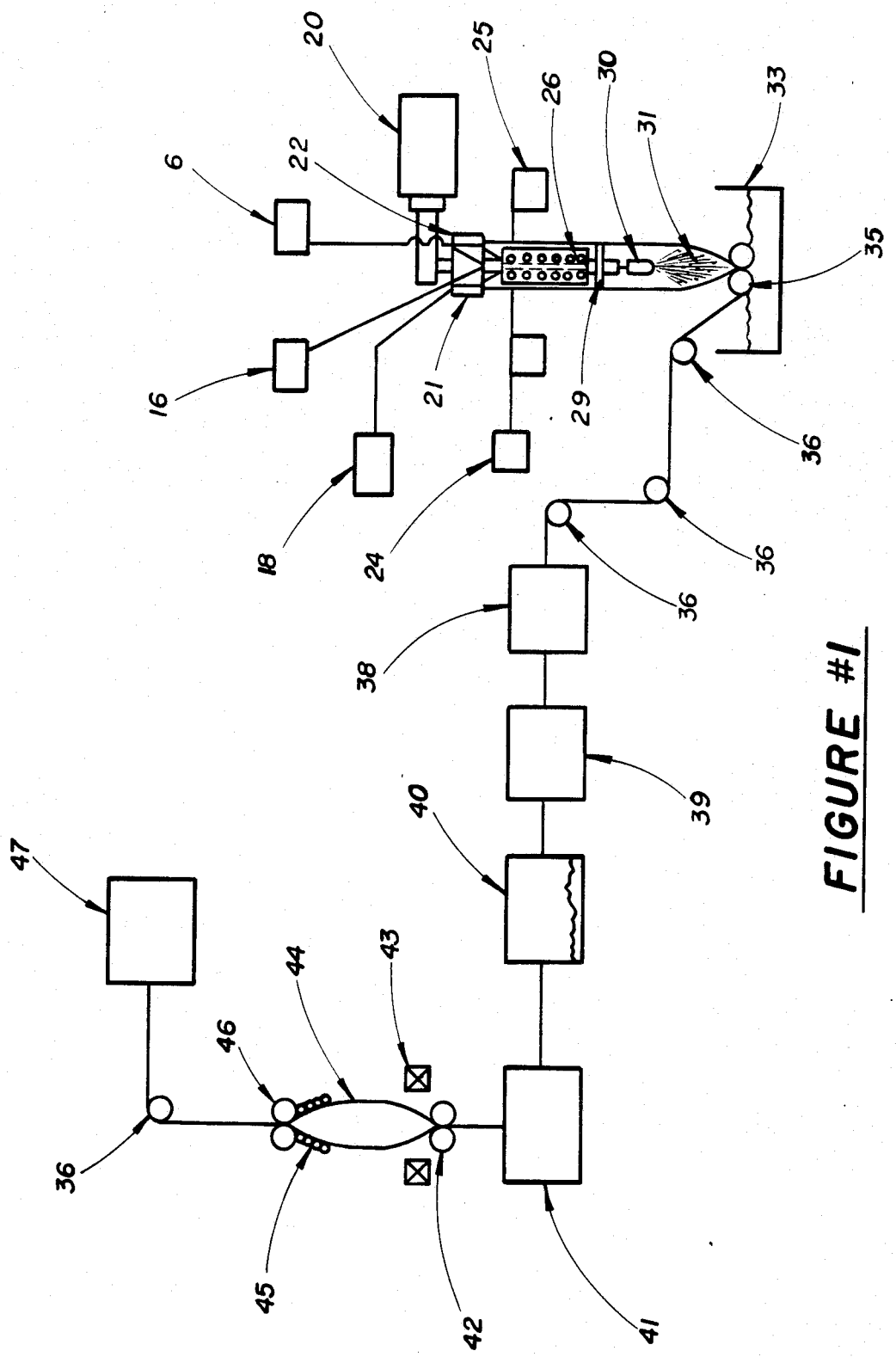
FIGURE #1

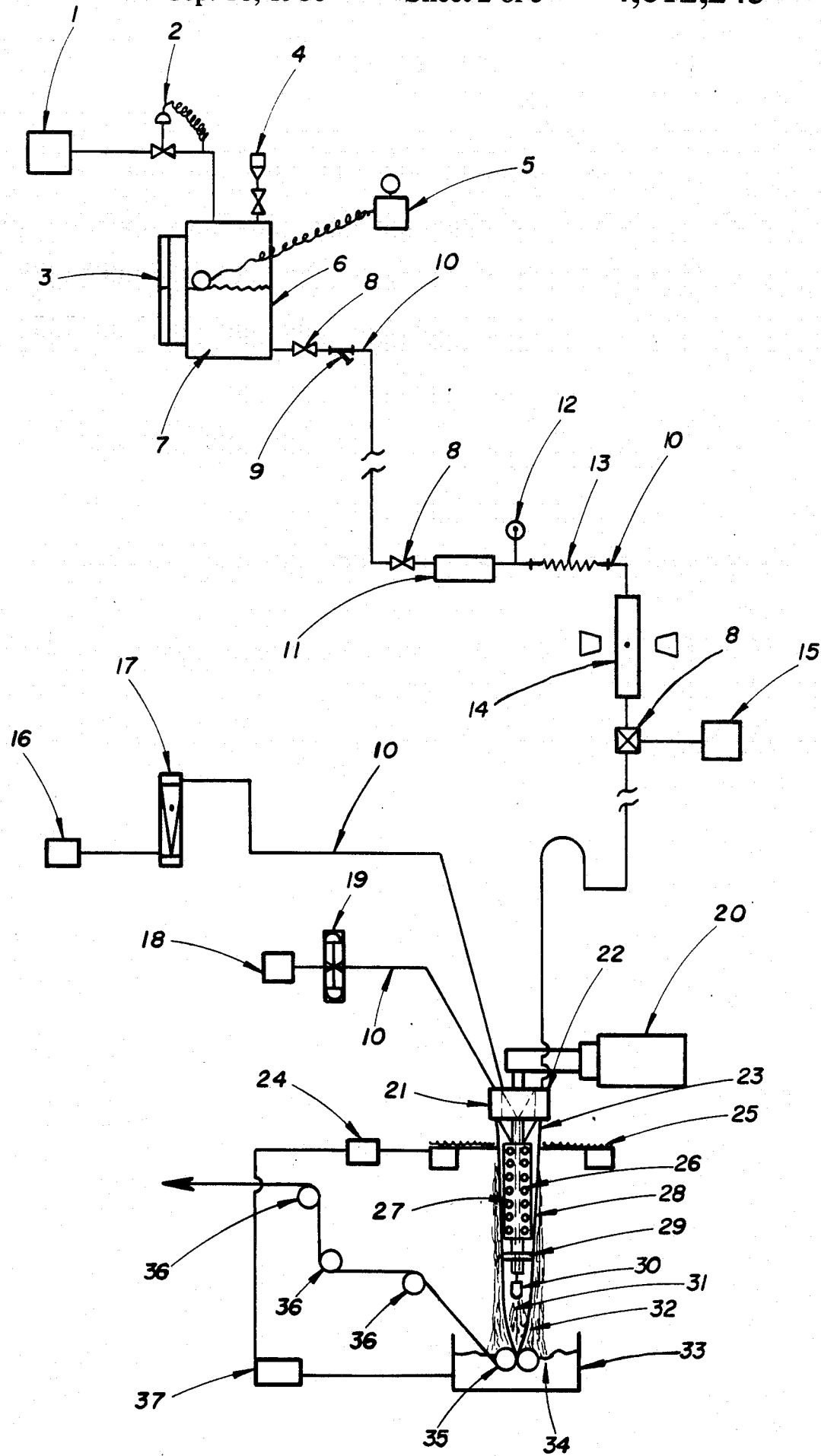
FIGURE #2

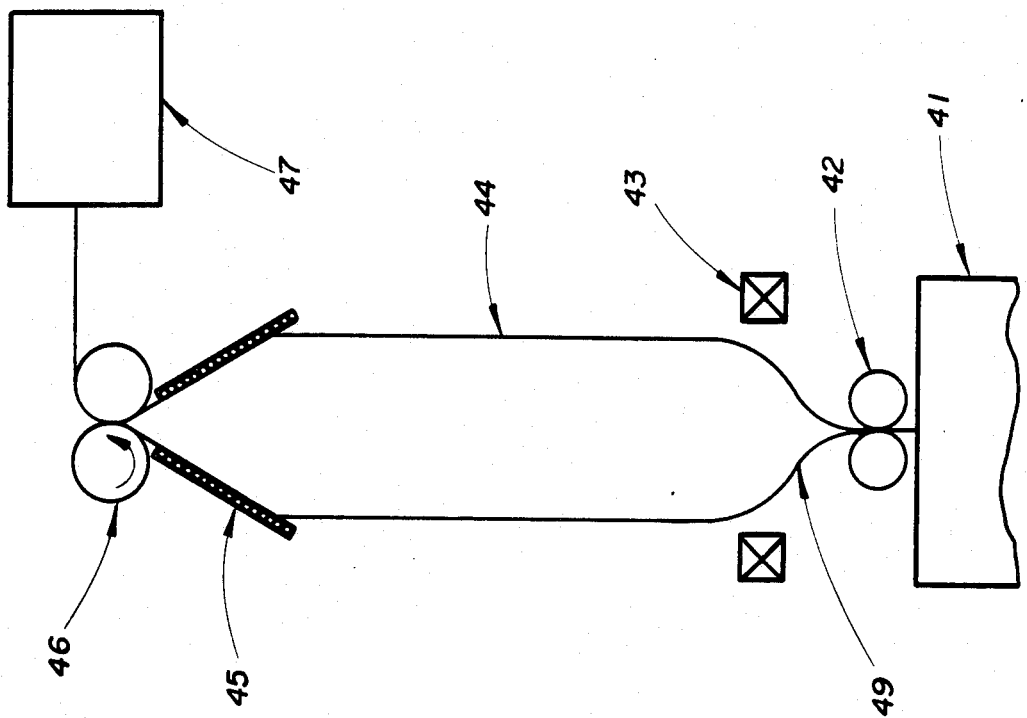
*FIGURE #4*
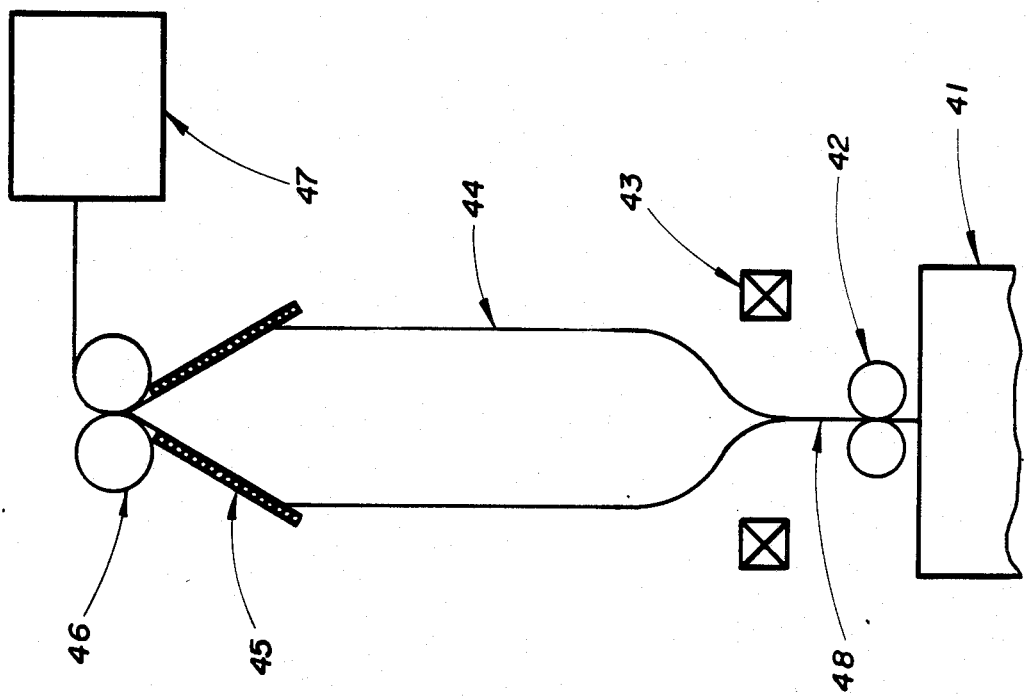
*FIGURE #3*

BLOWN BUBBLE PROCESS FOR PRODUCING ORIENTED THIN FILMS

This application is a continuation of application Ser. No. 523,294 filed on Aug. 15, 1983, now abandoned which is a continuation of application Ser. No. 289,018 filed July 31, 1981 also now abandoned.

BACKGROUND OF THE INVENTION

The present invention was initially developed as an improvement upon the blown bubble process for forming thin heat sealable oriented films of improved physical characteristics. However, upon review those skilled in the art will appreciate numerous other applications.

The blown bubble process has been utilized for many years and is well known by those skilled in the art. This process is disclosed in numerous patents, exemplary of which is U.S. Pat. No. 3,022,543 to W. G. Baird, Jr. et al, and is hereby incorporated by reference.

Generally speaking, the blown bubble process utilizes the application of inner pressure to stretch and thus orient a heat sealable polyolefin material which has been melt extruded in tubular form, cooled and reheated to its orientation temperature. The inner pressure is applied by the trapping of a gaseous bubble inside the extruded tubular structure so as to stretch the heated polyolefin material to orient the molecular infra-structure of the polymer. Reheating of the extruded material may be accomplished by means well known in the art such as a hot air oven, hot water or hot oil bath. Of course, the reheating means may vary depending upon the orientation temperature of the extruded material.

Many of the heat sealable polyolefin materials and, in particular homopolymers and copolymers and blends thereof of monoalpha polyolefins having from 2-8 carbon atoms, which have heretofore been utilized in the blown bubble process weld when heated to the temperature range in which the material can be oriented. Welding as used herein refers to the tendency of two or more surfaces of a given material to adhere to one another at certain temperatures and pressures. Accordingly, a problem which has arisen in past applications of the blown bubble process with extruded tubular materials which weld upon heating to their orientation temperature range is the resistance of the materials to separation by internal pressure as applied by the internally trapped gaseous bubble.

It is known in the art that the utilization of a film forming air mandrel, as opposed to a mandrel where the extruded film comes into actual contact with the forming mandrel, for supporting and forming the cooling melt extruded tubular material shortly after extrusion provides an increase in the optical properties of the extruded material. It is believed that this increase in clarity results because the inner surface of the cooling tubular material extruded over the air mandrel never contacts the mandrel and, therefore, is not submitted to the minute scratching, etc. which adversely affects a film's overall optical properties.

A major drawback of the blown film process when utilized in conjunction with materials which weld in their orientation temperature range is the limitation on film thickness. Heretofore, a film thickness of less than 0.50 mils was not consistently obtainable by utilization of the blown bubble process when applied to tubular extruded structures having as an inner surface a weldable polyolefin material. The limitation on thickness directly resulted from the internal welding of the surface of the heated tubular materials because the strength of the internal structure of the thin film material having a thickness of less than 0.50 mils was closely approximated or exceeded by the strength of the weld. Thus, in the past, the structural integrity of thin tubular films having an inner weldable surface and a thickness of less than 0.50 mils was compromised upon inflation of the tubular structure and subsequent attempted separation of the welded layers.

Unfortunately, it has been found that utilization of an air mandrel to increase film clarity as discussed above further limits the lowest obtainable film thickness since films processed utilizing the air mandrel exhibit increased welding. It is believed that this increased welding arises from improved inner surface contact of the collapsed tubular film which results from the more uniform, scratchless, film surface created through processing by the air mandrel. Therefore, utilization of an air mandrel apparently conflicted with the goal of obtaining a thinner film.

Yet another problem which confronted those skilled in the art in attempting to obtain a thin film of increased optical properties and decreased thickness should be noted. The problem was that the heat sealing characteristics of the thin film could not be compromised. This fact apparently ruled out the utilization of materials, apparatus or processes which were known to adversely affect the heat sealing characteristics of the thin film.

Lastly, it was also desired that the thin film would be able to be easily inked or printed upon. Thus, utilization of materials, apparatus or processes which were known to adversely affect the ink adhesion of the thin film appeared to be negated to those skilled in the art.

In summary, it can be stated that while those in the art were questing for thin films having increased clarity, decreased thickness and adequate heat sealing and inking characteristics, an impass appeared to have formed in that the air mandrel which could provide increased clarity unfortunately increased welding and, consequently, the minimum film thickness.

Accordingly, it is an object of the present invention to provide an improvement to the blown bubble process for orienting thin films by eliminating or greatly reducing internal welding during the process.

Another object of the present invention is to provide a thin polyolefin film having a thickness of less than 0.50 mils.

A still further object of the present invention is to provide a polyolefin film having improved clarity.

Yet another object of the present invention is to provide a polyolefin film having good heat seal characteristics.

An additional object of the present invention is to provide a polyolefin film having good ink adhesion.

A further object of the present invention is to provide a means for eliminating internal welding during the processing of thin tubular materials.

Still further objects and the broad scope of applicability of the present invention will become apparent to those of ordinary skill in the art from the details given hereinafter. However, it should be understood that the detailed description and specific examples which indicate the presently preferred embodiments of the invention are given by way of illustration only since various changes and modifications within the spirit and scope of the invention will become apparent to those of ordinary skill in the art from this detailed description.

SUMMARY OF THE INVENTION

It has been found that the above objects can be obtained by applying a polyorganosiloxane to the inner surface of the tubular extruded material after the material has passed over an air mandrel but prior to the collapsing of the tubular structure by nip rolls. The polyorganosiloxane acts as a release agent when the collapsed and reheated tubing is opened. The internal welding that is present upon opening and separation of the tubular structure is greatly reduced or entirely eliminated as a result of the presence of the polyorganosiloxane. Surprisingly, the heat sealing and ink adhesion characteristics of the polyolefin film are not adversely affected. Since the internal welding is, at the least, greatly reduced it has now become possible to more effectively employ an air mandrel and to produce films of greatly reduced thickness.

BRIEF DESCRIPTION OF THE DRAWINGS

FIG. 1 is a representation of the improved blown bubble process as disclosed by the present invention.

FIG. 2 is a detailed view of the process and equipment involved in applying a mist of polyorganosiloxane to the interior of an extruded tubular structure.

FIG. 3 is a representation of the blown bubble as it existed in the prior art process.

FIG. 4 is a representation of the blown bubble resulting from application of a mist of polyorganosiloxane to the interior of an extruded and thereafter heated and expanded tubular structure.

DETAILED DESCRIPTION OF THE DRAWINGS

Turning now to the drawings wherein like reference numerals are equivalent and, in particular, to FIG. 2 which is a detailed depiction of the extrusion and liquid polyorganosiloxane application system, it can be seen that compressed air source 1 which is controlled by automatic pressure control valve 2 provides pressurization to silicone head tank 6 by way of tubing 10. Silicone head tank 6 contains a quantity of liquid polyorganosiloxane 7 which has been added to the head tank 6 by way of silicone addition port 4. The level of liquid polyorganosiloxane 7 in tank 6 is monitored by level sight glass 3. Low levels of liquid polyorganosiloxane 7 in tank 6 may also be indicated by a low level alarm 5. Manual cutoff valves 8 are located throughout the entire system to isolate the various constituent parts for cleaning, repair, etc. The location of representative cutoff valves 8 is shown and the location of additional valves would be quite apparent to those of ordinary skill in the art. Liquid polyorganosiloxane 7 exits tank 6 in tubing 10 and thereafter passes through a fine mesh strainer 9 which removes any particulate matter which still may be present. After exiting the fine mesh strainer 9 the liquid polyorganosiloxane 7 continues by way of tubing 10 to metering pump 11. The outflow from metering pump 11 by tubing 10 is monitored by pressure gauge 12. Next, the liquid polyorganosiloxane 7 passes through a backflow restrictor 13 and into a high/low drop count alarm 14 for the precise regulation of the liquid polyorganosiloxane 7 flow. The liquid polyorganosiloxane 7 flow may be manually checked and calibrated as, for example, at 15 prior to it proceeding to and through tubular extrusion or coextrusion die 21. After passing through die 21 the liquid polyorganosiloxane 7 continues downward in tubing 10 which passes through both air mandrel 26 and stabilizing plug 29 on into siloxane spray nozzle 30.

Concurrently with the above-discussed provision of liquid polyorganosiloxane 7 to siloxane spray nozzle 30, a second compressed air source 16 which, of course, may be the same as compressed air source 1, provides pressurizing air through tubing 10 and air rotometer 17. After exiting air rotometer 17 the pressurizing air continues by way of tubing 10 to die 21. The pressurizing air then passes through die 21 and thereafter continues, by way of tubing 10, downward through air mandrel 26 and stabilizing plug 29 into siloxane spray nozzle 30. Siloxane spray nozzle 30 is a standard venturi type nozzle whereby the pressurized air provided from source 16, upon entering the siloxane spray nozzle 30, creates a small vacuum within nozzle 30 which transforms the liquid polyorganosiloxane 7 entering siloxane spray nozzle 30 into a very fine spray or mist 31.

Turning attention to the basic extrusion or coextrusion process as outlined in FIG. 2, it can be seen that resinous material placed into extruder 20, is heated and compressed into melt form and forced through die 21 which may be an extrusion or coextrusion die. Upon exit of the extruded tubular melt 23 from die 21 the melt 23 is quenched by cascading 28 chill water 34 which is provided by chill water source 24 to chill water ring 25. Chill water ring 25 encircles the tubular melt 23 such that the chill water 34 overflows the inner circumference of the chill water ring 25 and comes into cascading contact 28 with the extruded melt 23. The rapidly cooling melt 23 continues downward and is inwardly supported and formed by cylindrical air mandrel 26. Cylindrical air mandrel 26 is provided over its entire radial surface with numerous air orifices 27. The air mandrel 26 receives pressurized air from a third compressed air source 18, which may be the same as that of sources 1 and 16. Compressed air source 18 provides pressurizing air to die 21 by way of tubing 10 and a second air rotometer 19. The pressurizing air thereafter passes through die 21, enters air mandrel 26 and exits by air mandrel 26 air orifices 27. Upon exiting the air mandrel 26 by orifices 27 the pressurizing fluid supports the cooling extruded melt 23 without melt 23 contacting air mandrel 26. Die 21 is provided with air vents 22 through which tubing 10 may pass and by which the excess pressurizing air from sources 16 and 18 is vented.

Upon cooling, the extruded tubular melt 23 solidifies to form an extruded tubular structure 32 which contacts and is supported by a stabilizing plug 29. The cascading 28 chill water 34 falls and is collected in chill water bath tank 33. The chill water 34 may be recirculated from chill water bath tank 33 to chill water source 24 by way of pump 37. The solidified extruded tubing 32 is collapsed by nip rolls 35 and is transported in lay flat arrangement by transfer rolls 36.

Returning to the liquid polyorganosiloxane 7 application system and with reference to the basic extrusion or coextrusion process described above, mist 31 exits siloxane spray nozzle 30 and is deposited onto the inner surface of the solidified extruded tubular material 32. The mist is then internally transported along with the material 32 by nip rolls 35 and transfer rolls 36.

Turning to FIG. 1, the collapsed tubular extruded material 32 may be transported by transfer rolls 36 to an inventory area 38. Thereafter, depending on the resinous materials utilized and the properties desired in the finished extruded material 32, the material 32 may be irradiated by means well known in the art as at 39. From irradiation source 39 the material 32 may pass through yet another inventory area 40 and thence into a heating chamber means 41. Heating chamber means 41 is utilized to elevate the temperature of the material 32 to its orientation temperature. Heating chamber means 41 may be any means known in the art such as, for example, a hot air oven or hot water or oil bath. After material 32 is elevated to its orientation temperature it exits heating chamber means 41 through heating chamber means exit nip rolls 42 while surrounded by a cooling air ring 43. Then the heated lay flat material 32 is separated and expanded by formation of bubble 44 so as to orient the molecular structure of material 32. The bubble 44 is collapsed after orientation by a bubble conveying assembly 45 and deflate nip rollers 46 both of a type well known in the art. When it is desired to make film from the tubing, this can readily be accomplished by slitting the tubing as it leaves deflate nip rollers 46. The resultant film would have an outer layer, i.e. coating, of a polyorganosiloxane. The oriented lay flat material 32 is then transported by transfer rolls 36 to a packaging area 47 where the tube may be formed into a bag by means well known to those in the art.

Turning to FIGS. 3 and 4 which concentrate on the bubble 44 formation step, a bubble 44 formation as existed in the prior art is illustrated by FIG. 3. In particular, it is to be noted that welding occurs in area 48 (somewhat exaggerated for purposes of illustration) immediately following the exit of the material 32 from the heat chamber exit nip rolls 42. This situation is to be compared with that as illustrated in FIG. 4 which results from the application of a liquid polyorganosiloxane 7 to the inner surface of the tubular material 32. FIG. 4 clearly illustrates at 49 that welding of the inner surfaces of tubular material 32, upon passage through the heat chamber means 41 and the heat chamber exit nip rolls 42, is virtually eliminated when the heated tubular material 32 is inflated.

In view of the fact that liquid polyorganosiloxanes, while known as mold release agents, are also generally known to adversely affect the heat sealing characteristics of heat sealable thin irradiated films and, in particular, polyethylene films, the success of the method presently disclosed is considered to be highly unforeseen and surprising! The surprising success arises from the discovery that the liquid polyorganosiloxane 7, when applied as a mist in quantities of from 2 to 16 mg/sq. ft. of tubular extruded material 32, does not adversely affect the heat sealing characteristics of irradiated thin polyethylene material 32. When the liquid polyorganosiloxane 7 is applied in quantities less than 2 mg/sq. ft. of tubular extruded irradiated polyethylene material 32, the effectiveness of the liquid polyorganosiloxane 7 as an internal welding inhibitor is increasingly impaired with increasingly lower concentrations. When quantities of less than 1 mg of polyorganosiloxane per sq. foot of tubular extruded irradiated polyethylene material is applied it has been found that the effectiveness of the liquid polyorganosiloxane 7 as a welding inhibitor is negated. Additionally, at concentrations of liquid polyorganosiloxane 7 greater than 16 mg/sq. ft. of extruded irradiated polyethylene material 32, the heat sealing characteristics of the material 32 becomes more and more adversely affected. When concentrations of liquid polyorganosiloxane 7 greater than 20 mg/sq. ft. of extruded irradiated polyethylene material 32 are applied it has been found that the heat sealing characteristics of the polyethylene material 32 are destroyed.

While the above-discussed range for amount of polyorganosiloxane applied per square foot of extruded material applied to polyethylene, the applicable ranges for other materials which are weldable may be easily ascertained by those in the art without undue experimentation. The ranges will, of course, vary with material and the amount of irradiation the material is exposed to.

The following examples are offered only for the purpose of further disclosing to those skilled in the art means by which the present inventive subject matter may be reduced to practice and should not, in any way, be held as limiting the scope of the hereinafter appended claims.

EXAMPLE I

Plastic pellets of Dow Linear Intermediate Density Polyethylene Resin Type X061500.37 having a density of 0.935 gm/cc and a melt index of 2.5 were fed into extruder 20, compressed, heated and forced downward through a heated eight (8) inch diameter spiral tubular die 21 containing several air vent holes 22. The melt extrudate 23 exits in tubular form from the die orifice and is then transported over a downwardly tapering air mandrel 26. The air flow to the air mandrel 26 for supporting the tubular extrudate 23 was controlled in the range of 1-8 SCFM (standard cubic feet per minute) by rotometer 19. The rapidly cooling tubular material 32 then contacted and passed over stabilizing plug 29 below which the tube was collapsed and pulled through a pair of speed controllable nip rolls 35 with one of the nip rolls 35 being covered with neoprene.

Just above the point where the hot tubular melt extrudate 23 passes over the upper edge of the air mandrel 26, external quenching was initiated with cascading 28 chill water 34 supplied from an iris water ring 25. The chill water 34 was supplied from chiller 24 at a rate of 15 plus or minus 10 gallons per minute and a temperature of 46° plus or minus 6° F.

The liquid polyorganosiloxane spray coating or misting system consisted of an elevated 10 gallon head tank 6 containing a reservoir of liquid General Electric SF 18 polydimethysiloxane 7. The liquid polydimethylsiloxane 7 was carried through tubing 10 and valves 8 and a fine mesh strainer of 200 mesh or less 9 to the inlet or suction side of a low volume Milton Roy Mini-Pump 11 Model 396-9.4 having a delivery capacity range of from 4.7 to 47 ml per hour. In this example the pump 11 was set to delivery 0.2 ml per minute. The liquid polydimethylsiloxane 7 was then pumped against a back pressure restrictor 13 with a pressure gauge 12 reading of at least 50 psig. The liquid polydimethylsiloxane 7 then flowed by gravity through a high/low frequency alarm drop counter 14 and a manual flow calibration check point 15. The liquid polydimethylsiloxane 7 was then transported by tubing 10 through a die 21 vent hole 22, through the hollow support stem for the air mandrel 26 and into misting nozzle 30. The misting nozzle 30 was a Model A-3615 hi-low unit from Aetna Manufacturing.

A supply of compressed air 16 was transported to the misting nozzle 30 at a controlled flow rate of 1-2 SCFM by way of air rotometer 17. The venturi action of the nozzle 30 provided a downward mist 31 which peripherally coated the inner wall of the tubular material 32 before it was transported by the nip rolls 35 at a speed of 30 feet per minute. A material 32 transportation speed of 30 feet per minute when combined with a liquid polydimethylsiloxane 7 supply rate of 0.2 ml. per minute, as is here the case, equates to a coating application of 4 mg of liquid polydimethylsiloxane 7 per square foot of material 32.

After the tubular material 32 was collapsed by the nip rolls 35 it was transported by a series of transfer rolls 36 through an inventory area 38 and was then passed through an electron beam irradiation unit 39 wherein the material 32 was crosslinked by an irradiation dosage of 3.5 MR plus or minus 0.5 MR. The material 32 continued through a second inventory area 40 and into a heating oven 41 where its temperature was raised to 250 plus or minus 10° F. The material 32 then exited the oven 41 through a set of neoprene covered nip rolls 42, upward through bubble cooling air ring 43 and thence to a pair of driven deflate rolls 46. After the material 32 passed through the deflate rolls 46 a compressed air hose was inserted into the open end of the tube and the tube was opened back to the nip rolls 42. No inner tubular material 32 welding was observed. At this point the pressurized air flow was increased and the hot plastic tubular material 32 exiting from oven 41 was further inflated and expanded to a diameter approximately equal to five (5) times that of its original diameter. The driven deflate nip rolls 46 were then closed and set at a speed of 162 feet per minute. The automated bubble converging assembly 45 was then closed and the deflate nip rolls were lowered by driven jack screws until a bubble diameter of 30 inches was obtained.

As a result of the above example the six (6) inch diameter tubing with a sixteen (16) mil wall thickness was manufactured into a thin film having a finished thickness of 0.6 mil and being oriented 5 to 1 in the transverse direction and by 5.4 to 1 in the longitudinal direction.

Thus, after expansion, the final coating of polydimethylsiloxane was approximately 0.148 mg. per square foot of final product.

The hot wire trim seal strength of this material, when sealed with the siloxane layers interfaced, was not adversely affected as compared to the hot wire trim seal strength of the material when sealed with the siloxane layers noninterfaced. In fact when the siloxane layers were interfaced an improved hot wire trim seal strength was obtained. This seal strength data which is tabulated below was obtained by dynamically forming hot wire trim seals on a Weldotron 1400 at 80 packages per minute. Five seal strength tests at each wire amperage were conducted and the averages are tabulated below.

| AMPERAGE | 1.3 | 1.4 | 1.5 | 1.6 | AVG. |
|---|---|---|---|---|---|
| Average seal strength lbs./in. without siloxane interfaced | 4.3 | 4.1 | 3.7 | 4.4 | 4.1 |
| Average seal strength with siloxane interfaced | 6.3 | 5.7 | 6.3 | 6.7 | 6.3 |

The seal strength was measured on one (1) inch wide seals with a manual Scott tester model X5-D9280.

EXAMPLE II

The procedures of Example I were repeated except that the thickness of the melt 23 as extruded was 8 mils rather than 16 mils. Utilization of this decreased extrudate 23 thickness resulted in an oriented film having a thickness of 0.30 mils. This result could not be arrived at without utilization of the internal liquid polyorganosiloxane 7 spray. Without the liquid polyorganosiloxane 7 the heated material 32 exiting the oven 41 was internally welded so extensively that it could not be reopened or inflated.

EXAMPLE III

The procedures of Example I were repeated except that a 70/30 percent, by weight, blend of conventional low density polyethylene (Rexene PE 109) and high density polyethylene (ARCO FB66), respectively, was substituted for the Dow Linear Intermediate Density Polyethylene XO61500.37. An irradiation dosage of 5 MR plus or minus 1 MR was required. As in Example I, 16 mil extrudate produced 0.6 mil finished film.

It is anticipated that the minimal obtainable thickness utilizing the liquid polyorganosiloxane 7 spray will be 0.5 mil finished product. Without the liquid polyorganosiloxane spray the present minimal obtainable finished product is 0.66 mil.

Hot wire heat seal strength data for this material is tabulated below. These seals were made statically on a Weldotron 6402 L Bar Sealer set at 5 amps, wire expansion gap ¼ inch and a 1.5 second dwell time.

Five samples of the seal strength without the siloxane interfaced and with the siloxane interfaced were measured. Additionally, the seal strength of material upon which an excessive amount of siloxane (24 mg. per sq. foot) was applied and then interfaced are tabulated.

The averages are:
Average seal strength without siloxane interface: 4.7 lbs/in.
Average seal strength with siloxane interface 6.9 lbs/in. (0.148 mg. per sq. foot):
Average seal strength with excess applied siloxane 2.4 lbs/in. (0.889 mg. per sq. foot):

The seal strength was measured on a Scott tester CRE 500.

Clearly the seal strength was enhanced when an amount of polyorganosiloxane within the disclosed range was applied. However, when excess polyorganosiloxane was applied the hot wire trim seal strength deteriorated greatly.

EXAMPLE IV

The procedures of Example I were repeated except linear low density Dowlex 2032 polyethylene resin of density 0.926 gm/c² and melt index of 2.0 was substituted for the Dow XO61500.37. Extruded 16 mil melt resulted in a finished film thickness of 0.6 mil.

The following table demonstrates various physical characteristics of bubble oriented films produced from Dowlex polyethylene XO61500.37 resin with an air mandrel and with and without internal application of liquid silicone.

| TEST | ASTM TEST NO. | WITH AIR SHOE W/O SILICONE | | WITH AIR SHOE WITH SILICONE | | | | |
|---|---|---|---|---|---|---|---|---|
| Nominal Film Thickness, mils | — | 0.75 | 0.60 | 0.75 | 0.60 | 0.50 | 0.40 | 0.30 |
| Tensile, PSI - MD | D 882 | 17,400 | 17,400 | 18,600 | 20,000 | 19,100 | 20,800 | 22,000 |

| TEST | ASTM TEST NO. | WITH AIR SHOE W/O SILICONE | | | WITH AIR SHOE WITH SILICONE | | | |
|---|---|---|---|---|---|---|---|---|
| Tensile, PSI - TD | D 882 | 17,300 | 15,000 | 18,400 | 16,000 | 23,900 | 22,100 | 20,100 |
| Elongation, % MD | D 882 | 114 | 115 | 117 | 123 | 110 | 112 | 97 |
| Elongation, % TD | D 882 | 106 | 95 | 125 | 139 | 104 | 86 | 81 |
| Tear Propagation, gms - MD | D 1938 | 8.5 | 6.5 | 8.3 | 7.6 | 5.4 | 3.6 | 2.7 |
| Tear Propagation, gms - TD | D 1938 | 8.1 | 6.2 | 10.1 | 9.4 | 5.8 | 3.0 | 2.6 |
| Ball Burst, (cm-kg) | D 3420 | 14.9 | 11.4 | 16.4 | 16.9 | 12.6 | 9.4 | 8.8 |
| Haze, % | D 1003 | 1.0 | 1.2 | 1.5 | 1.1 | 0.7 | 0.8 | 0.9 |
| Gloss, % - 45° Angle | D 2457 | 97 | 95 | 91 | 94 | 95 | 97 | 97 |
| Total Transmission, % | D 1003 | 91.9 | 91.8 | 91.4 | 92.1 | 92.1 | 92.1 | 92.2 |
| Clarity, % | D 1746 | 73.8 | 83.3 | 74.2 | 76.7 | 84.2 | 86.9 | 86.7 |

As stated above, the examples are for informational purposes only and are not intended to limit the scope of the present invention. In particular, the scope of the present invention is envisioned to encompass all of the numerous other resins which weld during processing. Addtionally, the present invention is applicable to coextruded materials wherein the inner coextruded layer welds during processing.

The liquid polyorganosiloxane 7 need not be GE SF 18 polydimethylsiloxane to be effective. However, since this material has received FDA food usage approval, it is preferred in food applications at this time. Other comparable grades of liquid polyorganosiloxanes 7 from G.E., Dow-Corning or the Union Carbide Corporation are available and may be utilized. The general formula of these materials is $(R_1R_2SiO)_n$ and their structure is believed to be:

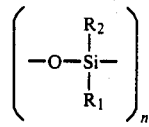

$R_1$ and $R_2$ may be the same as in polydimethysiloxane.

In food applications, viscosity levels of above 300 are necessary to meet the FDA requirements. Of course, in non-food applications grades of lower viscosity may be appropriate.

As a result of the increased structural strength of linear low and intermediate density resins, a final product thickness of less than 0.5 mil will be consistently obtainable with the blown bubble process when linear polyethylene precursor resins having a density range of from 0.915 to 0.940 are utilized in conjunction with the internal application of a polyorganosiloxane. A final product thickness of less than 0.5 mil is probably not consistently obtainable when standard, non-linear, resins are employed in conjunction with the above disclosed improved process. However, the smallest obtainable final product thickness for such non-linear resins will be reduced through utilization of the improved process.

Lastly, it should be noted that the amount of polyorganosiloxane per square foot of final product will vary with the expansion ratios utilized (i.e. the size of the bubble). Taking the expansion ratios in Example I of 5 to 1 in the transverse direction coupled with 5.4 to 1 in the longitudinal direction, it is easily calculated that the one square foot of extruded material will be expanded into 27 square feet of final product. Coupling this exemplary ratio with an application range of from 1-20 milligrams of polyorganosiloxane per square foot of extruded polyethylene material the range of polyorganosiloxane per square foot of final polyethylene film product if calculated to be from 0.036 to 0.741 milligrams of polyorganosiloxane per square foot of finished polyethylene film material. The preferred range of 2-16 milligrams per square foot of extruded material calculates to be from 0.074 to 0.593 milligrams of polyorganosiloxane per square foot of finished polyethylene material. And, as stated above, when 4 milligrams of polyorganosiloxane are applied to the extruded polyethylene the coating will be 0.148 milligrams per square foot of final product. The amount of polyorganosiloxane per square foot of final product can be calculated for any known expansion ratio. Expansion ratios generally vary, depending on the material's characteristics, from 3 to 1 in the transverse direction coupled with 3 to 1 in the longitudinal direction to 7 to 1 in the transverse direction coupled with 7 to 1 in the longitudinal direction.

We claim:

1. In the blown bubble process for processing a polyolefin material extruded as a tube having a heat sealable interior surface layer, the improvement comprising the following steps in the order given:
    spraying a coating of from 1 milligram to 20 milligrams of a polyorganoxiloxane per square foot of said interior surface layer; then
    collapsing said extruded tube into a layflat arrangement;
    irradiating the collapsed tube;
    heating the collapsed tube to its orientation temperature; and
    expanding the collapsed tube by formation of a bubble;
    whereby welding of the interior surface layer of the collapsed tube to itself is greatly reduced and the heat sealability of the interior surface layer to itself is improved.

2. The process of claim 1, wherein said tube comprises a multi-layer coextruded tube.

3. The process of claim 1, wherein said interior surface layer comprises at least one of the following groups: (a) homopolymers of monoalpha polyolefins having from 2-8 carbon atoms; (b) copolymers of monoalpha polyolefins having from 2-8 carbon atoms; (c) blends of homopolymers of monoalpha polyolefins having from 2-8 carbon atoms.

4. The process of claim 1, wherein said polyorganosiloxane is polydimethysiloxane.

5. The process of claim 3, wherein the interior surface layer comprises polyethylene.

6. The process of claim 3, wherein said interior surface layer comprises a blend of polyethylene.

7. The process of claims 4 or 6, wherein said polyorganosiloxane is polydimethylsiloxane.

8. The process of claim 7, wherein said coating consists essentially of from 2 milligrams to 16 milligrams of polydimethylsiloxane per square foot of said interior surface layer.

9. The process of claim 7, wherein said coating consists essentially of four milligrams of polydimethylsiloxane per square foot of said interior surface layer.

10. The process of claim 1, further comprising the step of slitting the extruded tube to form a film.

11. The process of claim 1, wherein said coating comprises from 2 milligrams to 16 milligrams of polyorganosiloxane per square foot of said interior surface layer.

12. The process of claim 1, wherein said coating comprises 4 milligrams of polyorganosiloxane per square foot of said interior surface layer.

13. The process of claim 1, further comprising the step of forming said tube into a package.

14. A polyolefin film formed by a process comprising, in the order given, the steps of:
   extruding a polyolefin material as a tube having a heat sealable interior surface layer;
   passing said tube over an air mandrel;
   providing a coating of from 1 milligram to 20 milligrams of a polyorganosiloxane per square foot of said interior surface layer; then
   collapsing the tube into a lay-flat arrangement;
   irradiating the collapsed tube;
   heating the collapsed tube to its orientation temperature;
   expanding said polyolefin material to form a tube having an interior surface layer having a coating from 0.036 milligram to 0.741 milligrams of said polyorganosiloxane per square foot of said interior surface layer; and
   slitting the tube to form a film wherein said heat sealable interior surface layer is a surface of said film and is adapted to form an improved heat seal with itself of at least about 5.7 lbs./in.

15. The film formed by the process of claim 14, wherein a coating of from 2 milligrams to 16 milligrams of a polyorganosiloxane is provided per square foot of said interior surface layer and said interior surface layer has from 0.074 milligrams to 0.593 milligrams of polyorganosiloxane per square foot of said interior surface layer after orientation.

16. The film formed by the process of claim 14, wherein a coating of 4 milligrams of a polyorganosiloxane is provided per squre foot of said interior surface layer and said interior surface layer comprises 0.148 milligrams of polyorganosiloxane per square foot of said interior surface layer after orientation.

17. The film formed by the process of claim 14, wherein said polyorganosiloxane consists essentially of polydimethylsiloxane.

18. A package formed from the film of claim 14.

* * * * *

UNITED STATES PATENT AND TRADEMARK OFFICE
CERTIFICATE OF CORRECTION

PATENT NO.   : 4,612,245

DATED        : September 16, 1986

INVENTOR(S)  : Mueller et al

It is certified that error appears in the above-identified patent and that said Letters Patent is hereby corrected as shown below:

In column 10, line 59, after "homopolymers" insert --and copolymers--.

Signed and Sealed this

Second Day of December, 1986

*Attest:*

DONALD J. QUIGG

*Attesting Officer*  *Commissioner of Patents and Trademarks*